(12) United States Patent
Takiguchi et al.

(10) Patent No.: US 6,351,299 B2
(45) Date of Patent: *Feb. 26, 2002

(54) LIQUID CRYSTAL DISPLAY DEVICE

(75) Inventors: Yasuyuki Takiguchi, Sagamihara; Hiroyuki Takahashi; Akihiko Kanemoto, both of Yokohama, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,798

(22) Filed: Apr. 11, 1997

(30) Foreign Application Priority Data

Apr. 15, 1996 (JP) ............................................. 8-116955

(51) Int. Cl.[7] ...................... G02F 1/1335; G02F 1/137
(52) U.S. Cl. ..................... 349/121; 349/119; 349/175; 349/118; 349/180; 349/181
(58) Field of Search ................................. 349/117, 119, 349/121, 75, 76, 175, 180, 181, 118

(56) References Cited

U.S. PATENT DOCUMENTS

| | | | | |
|---|---|---|---|---|
| 5,044,732 A | * | 9/1991 | Kimura et al. | 349/76 |
| 5,056,896 A | * | 10/1991 | Iimura et al. | 349/117 |
| 5,760,859 A | * | 6/1998 | Bosma et al. | 349/117 |
| 5,844,648 A | * | 12/1998 | Higa | 349/117 |

* cited by examiner

*Primary Examiner*—William L. Sikes
*Assistant Examiner*—Tai V. Duong
(74) *Attorney, Agent, or Firm*—Cooper & Dunham LLP

(57) ABSTRACT

A liquid crystal display device is disclosed, comprising a cholesteric liquid crystal layer which has an intrinsic helical pitch of approximately twice as large as a thickness of the liquid crystal layer and also has a bistable character capable of switching by an application of voltage, and further provided with at least one birefringent medium layer between a polarizer and a substrate. This construction of the liquid crystal display device results in a reduction of birefringent effects, whereby achieving a high contrast, satisfactory color purity, and other display characteristics such as a higher duty ratio operation and faster time response, suitable for displaying a large volume of information data.

10 Claims, 7 Drawing Sheets

LIQUID CRYSTAL DISPLAY DEVICE

BACKGROUND

1. Field of the Invention

This invention relates in general to liquid crystal display devices and more particularly, to the display devices comprising cholesteric liquid crystals having bistable characteristics and provided with birefringence medium layers.

2. Description of the Related Art

Liquid crystal display devices typically comprise a layer of liquid crystals placed between a pair of light transparent substrates provided with alignment films and transparent electrodes, a pair of polarizers disposed on outward surfaces of the substrates, whereby constituting liquid crystal cells.

Several liquid crystal display devices using bistable cholesteric liquid crystals have been developed (for example, Japanese Patent H1-51818). Liquid crystal cells of the display device include a layer of cholesteric liquid crystals which are constituted to have an intrinsic helical pitch of approximately twice as large as a thickness of the liquid crystal layer.

In addition, the liquid crystal cells have a bistable character and can be switched between two states by an application of voltage, such that a twist angle of the liquid crystal layer along the layer thickness is either approximately 360° or 0°, corresponding to a twisted state or a uniform state (non-twisted state), respectively. It may be noted that the latter value (approximately 0°) is not necessarily 0° but a value subtracted 360° from the above-mentioned "approximately 360°".

The pair of polarizing plates are each provided on an upper and a lower faces of the cell, whereby constituting the liquid display device, as aforementioned.

When the polarizing plates are each arranged such that a transparency axis of one plate makes a right angle to the other, and that a direction of the liquid crystal alignment at the uniform state makes a 45° angle to the transparent axis of polarizing plate, birefringent colors are generally observed.

These colors are not preferable for black and white displays, and a white display color is obtained by adjusting a $\Delta$nd value of the device to about 270 nm, where $\Delta$n and d represent an optical anisotropy of the liquid crystal and a thickness of the liquid crystal layer, respectively. Although some birefringence may also arise in the twisted state, this results in a nearly black display color due to relatively small values of the birefringence in that state, without significantly affecting display qualities.

As above-mentioned, display colors of nearly black and white quality can be obtained by conventional bistable liquid crystal display devices using cholesteric liquid crystals. However, due to the birefringence in the twisted state of the liquid crystal, in practice, there exist a certain amount of the light which breaks through display devices in black display state, resulting in an insufficient contrast. In addition, when these liquid crystal cells are used as color displays equipped with color filters, the above-mentioned coloration gives rise to serious problems, and satisfactory color purity has not been achieved.

SUMMARY OF THE INVENTION

It is therefore an object of the present invention to provide liquid crystal display which overcomes the above-noted difficulties.

A further object of the present invention is to provide a display device with a high contrast and satisfactory color quality when used as color displays equipped with color filters, and also to achieve display characteristics such as a higher duty ratio operation and faster time response, suitable for displaying a large volume of information data.

These and other objects of the present invention are accomplished by the provision of a liquid crystal display device including a cholesteric liquid crystal layer which has an intrinsic helical pitch of approximately twice as large as a thickness of the liquid crystal layer, which is disposed between a pair of substrates and has a bistable character capable of switching by an application of voltage. The display device also includes a pair of polarizers each provided on a upper and lower faces of a liquid crystal cell.

In the present invention, at least one birefringent medium layer is further provided between a polarizer and a substrate for either one of a upper or lower set of the polarizer and the substrate. This results in a reduction of birefringent effect of the display device at either one of the bistable states, whereby solving the afore-mentioned problems of the conventional display devices.

According to another aspect of the present invention, the birefringent medium layer has a twist angle which has approximately the same magnitude as, and an opposite direction to, that of the liquid crystal layer, a $\Delta$nd value approximately equal to that of the liquid crystal layer, and an approximately right angle between a slow axis of the birefringent medium layer and an alignment direction of a face opposing to the birefringent medium layer, of the liquid crystal cell.

According to yet another aspect of the invention, the birefringent medium layer is nearly uniaxial, has a slow axis in the plane of the birefringent medium layer and a $\Delta$nd value approximately equal to that of a liquid crystal cell. In addition, the birefringent medium layer is provided so as to have an approximately right angle between a slow axis of the birefringent medium layer and an alignment direction of the face of the liquid crystal, opposing to the birefringent medium layer.

According to another aspect of the invention, the birefringent medium layer is selected from the group consisting of a stretched or extruded polymer film, a liquid crystal cell having a homogeneous alignment, an aligned polymer liquid crystal, or an alignment-immobilized liquid crystalline polymer which is obtained by freezing molecules of the polymer liquid crystal aligned homogeneously.

By this construction of the liquid crystal display, the birefringent effect can be reduced, whereby achieving a high contrast, satisfactory color purity, and other display characteristics such as a higher duty ratio operation and faster time response, suitable for displaying a large volume of information data.

BRIEF DESCRIPTION OF THE DRAWINGS

Preferred embodiments of the invention are described hereinbelow with reference to the drawings wherein.

DESCRIPTION OF THE ILLUSTRATIVE EMBODIMENTS

In the description which follows, specific embodiments of the invention particularly useful in liquid crystal display devices, comprising cholesteric liquid crystal layers having a bistable character.

It is understood, however, that the invention is not limited to these embodiments. For example, it is appreciated that the construction and the fabrication methods of the liquid crystal display in the present invention are adaptable to any form of liquid crystal display devices. Other embodiments will be apparent to those skilled in the art upon reading the following description.

The invention provides a liquid crystal display device including a cholesteric liquid crystal layer which has an intrinsic helical pitch of approximately twice as large as a thickness of a liquid crystal layer, which is disposed between a pair of substrates and has a bistable character capable of switching by an application of voltage such that a twist angle of said liquid crystal layer along the direction of a layer thickness is either approximately 360° or an angle subtracted 360° from the angle value above-mentioned, which is not necessarily 0°.

The substrates are treated for liquid crystal alignment (hereinafter referred to as "alignment treated") such that a direction of the alignment has a slight inclination angle relative to the substrate and substantially parallel to each other. The display device also includes a pair of polarizers each provided on a upper and lower faces of the liquid crystal cell.

In the present invention, at least one birefringent medium layer is further provided between the polarizer and the substrate for either one of an upper or lower set of the polarizer and the substrate. This results in a reduction of the birefringent effect of the display device, whereby solving the afore-mentioned problems of the conventional display devices.

Figure 5:
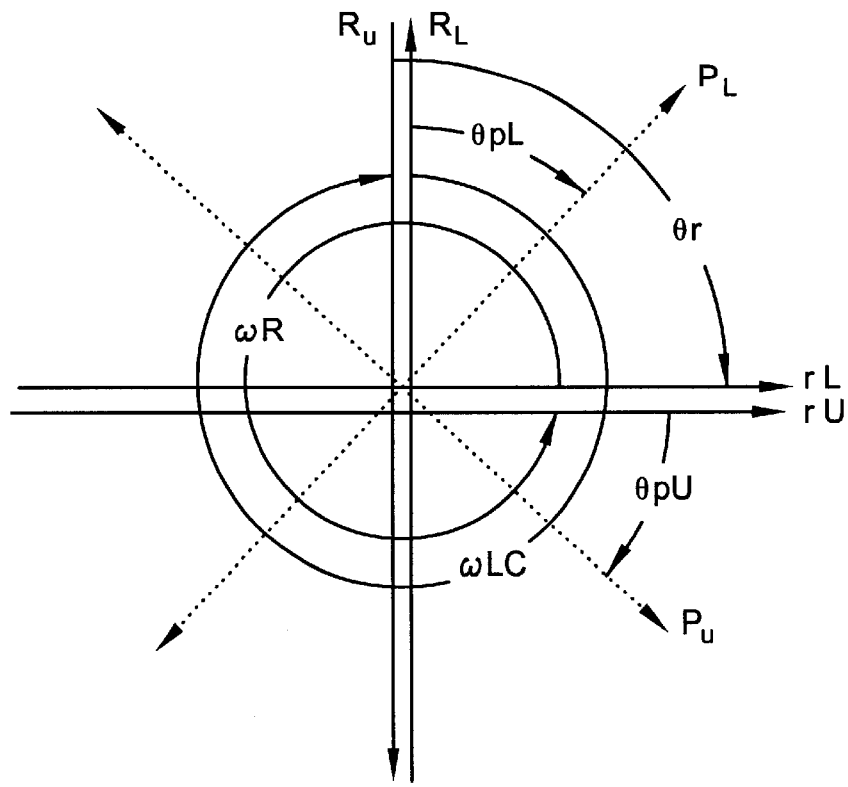
FIG. 5 is a schematic showing an arrangement of a plurality of axes of a liquid crystal display in accordance with a first embodiment of the invention wherein a birefringent medium layer is provided, having a twist angle which has approximately the same magnitude as, and an opposite direction to, that of a liquid crystal layer.
Figure 7:
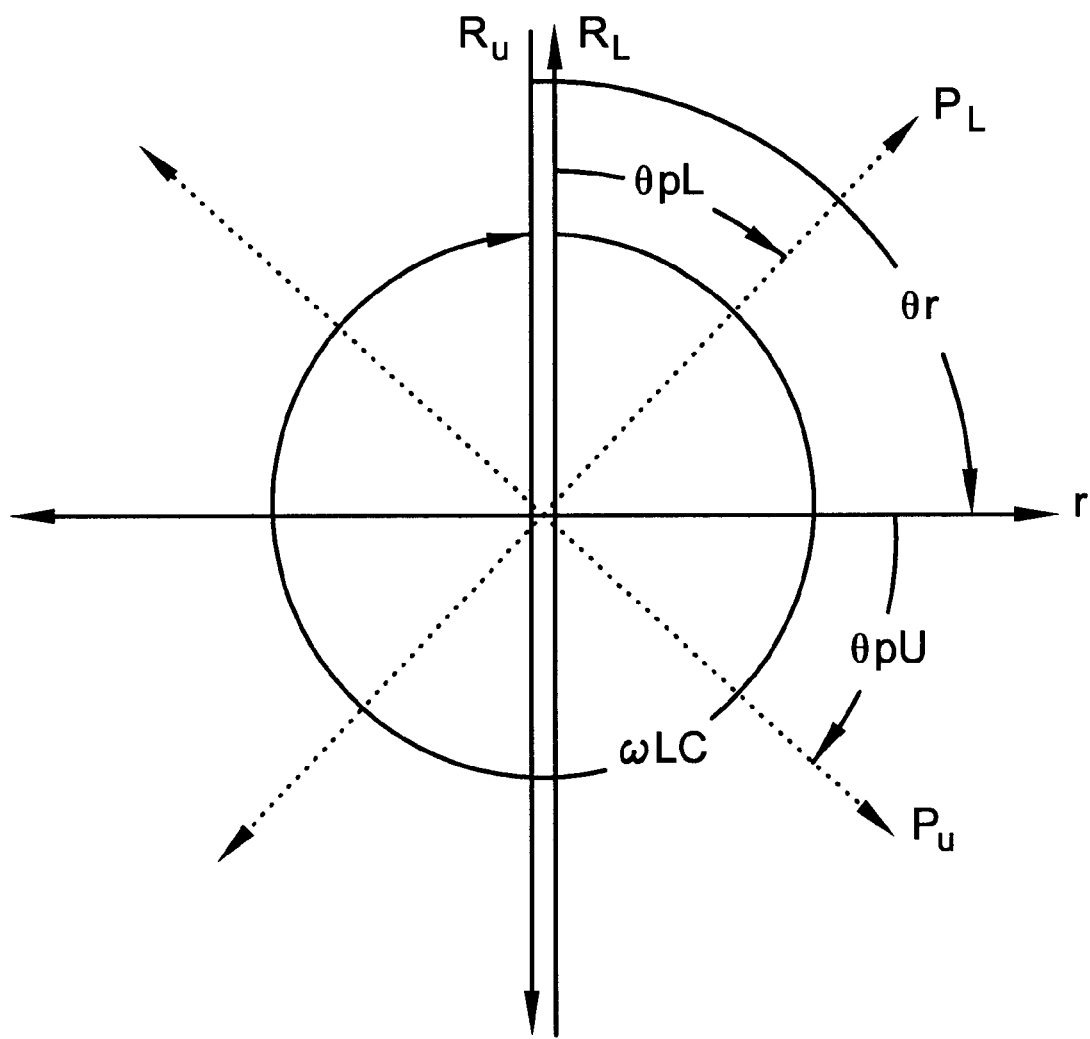
FIG. 7 a schematic showing an arrangement of a plurality of axes of a liquid crystal display in accordance with a second embodiment of the invention wherein a birefringent medium layer is selected such that a birefringent medium layer to be nearly uniaxial with its slow axis in the plane of the layer its Δnd value approximately from 0.1 to 0.2 time of that of liquid crystal cell.

By "substantially parallel" in the above description, it is meant that, each having a slight inclination angle relative to each of the substrate as shown in FIGS. 5 and 7, rL and rU are approximately parallel each other or the angle between these two is within 30°. Similarly, by "approximately 360°", it is meant that an angle of from 330° to 390°, and more preferably from 340° to 380°.

Figure 1:
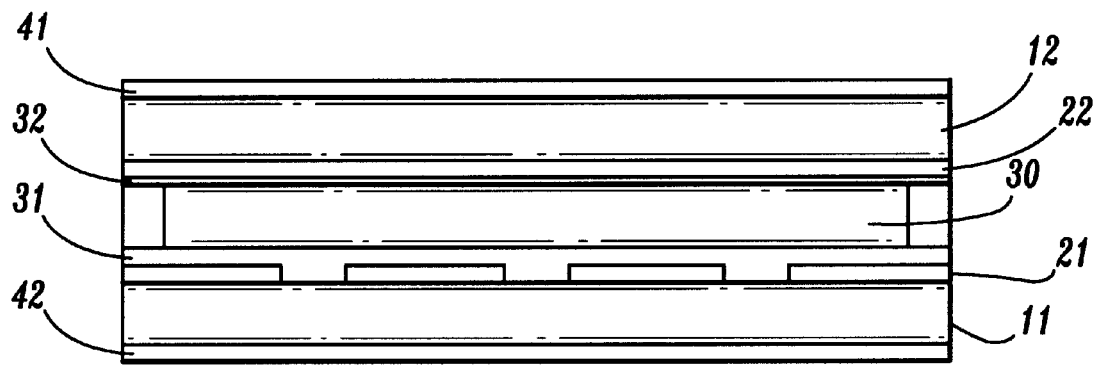
FIG. 1 is a cross section of a conventional liquid crystal display having a bistable character, comprising a cholesteric liquid crystal layer.

FIG. 1 is a cross section of a conventional liquid crystal display, having a bistable character, comprising a layer 30 of liquid crystals placed between a pair of light transparent substrates, a lower substrate 11 and upper substrate 12, which are provided with transparent electrodes 21 and 22 for applying voltage, and alignment films 31 and 32 for aligning liquid crystals, and a pair of polarizers 41 and 42.

Figure 2A:
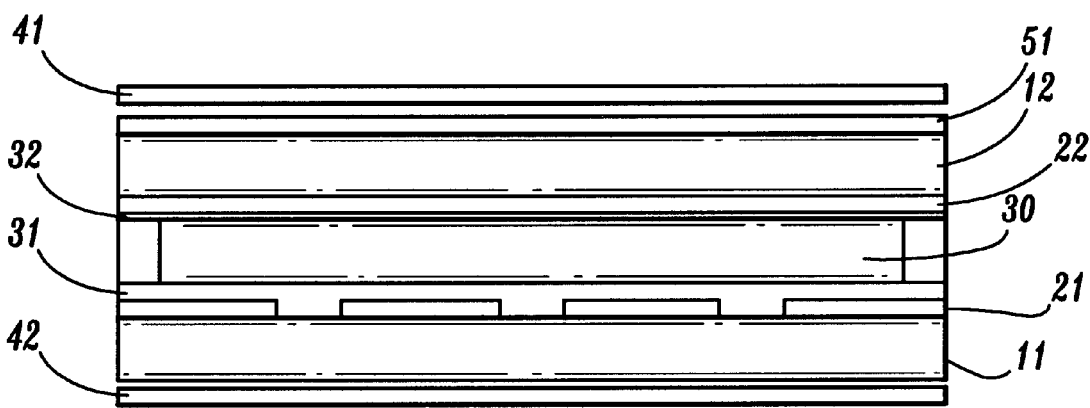
FIGS. 2A–2C are cross-sectional views of a liquid crystal display in accordance with the invention, wherein a birefringent medium layer is further provided between an upper substrate and a polarizer in addition to the display structure of FIG. 1.

FIG. 2 is a cross section of a liquid crystal display of the present invention, wherein a birefringent medium layer 51 is further provided to reduce a birefringent effect between an upper substrate 12 and a polarizer 41, in addition to the structure of FIG. 1.

Figure 3:
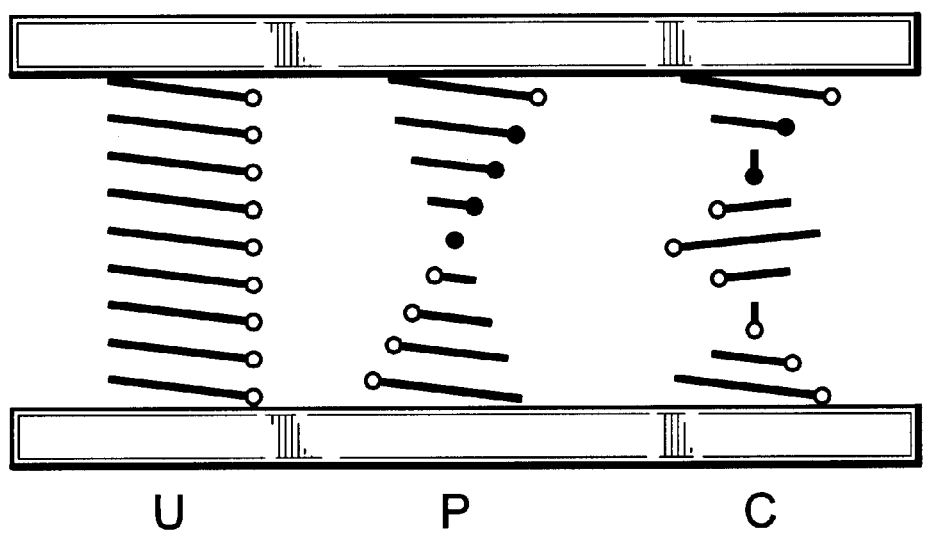
FIG. 3 is a schematic showing alignments of liquid crystal molecules in liquid crystal cells.

FIG. 3 is a schematic showing alignment of liquid crystal molecules in liquid crystal cells, wherein the characters U, P and C represent a uniform (or non-twisted) state, 180° twisted state and 360° twisted state, respectively.

There preferably used is a liquid crystal layer comprised of nematic phase liquid crystals mixed with liquid crystals of a cholesteric phase so as to have such a composition that a resultant liquid crystal layer exhibits a cholesteric phase.

By the alignment films, liquid crystal molecules in the cell are aligned so as to have a slight angle of inclination relative to the face of the substrate. Moreover, the angles of inclination relative to each of the upper and lower substrates are opposite in its sign, shown as the state P in FIG. 3.

As aforementioned, the liquid crystal layer is constructed such that the layer has an intrinsic helical pitch of approximately twice as large as a thickness of the liquid crystal layer. Therefore, without any restraint by the alignment layer, the approximately 180° twisted state is the stable state for the layer of this construction. By the above-mentioned "approximately twice", it is meant that the d/P value is preferably from 0.3 to 0.8, where d and P represent a thickness of the liquid crystal layer and the intrinsic pitch of the liquid crystal, respectively. In addition, the above-mentioned twisted state may have an angle from 150° to 210°.

By contrast, when the liquid crystal cell is constructed so as to have inclination angles under the restraint by the alignment films as above-mentioned P state in FIG. 3, two metastable states arise due to the splay deformation with an increased elastic energy, which are represented as U and C in FIG. 3 and referred to as a uniform state and a 360° twisted state, respectively. These two matastable states can be reversibly switched by the application of the voltage, as aforementioned.

Figure 4:
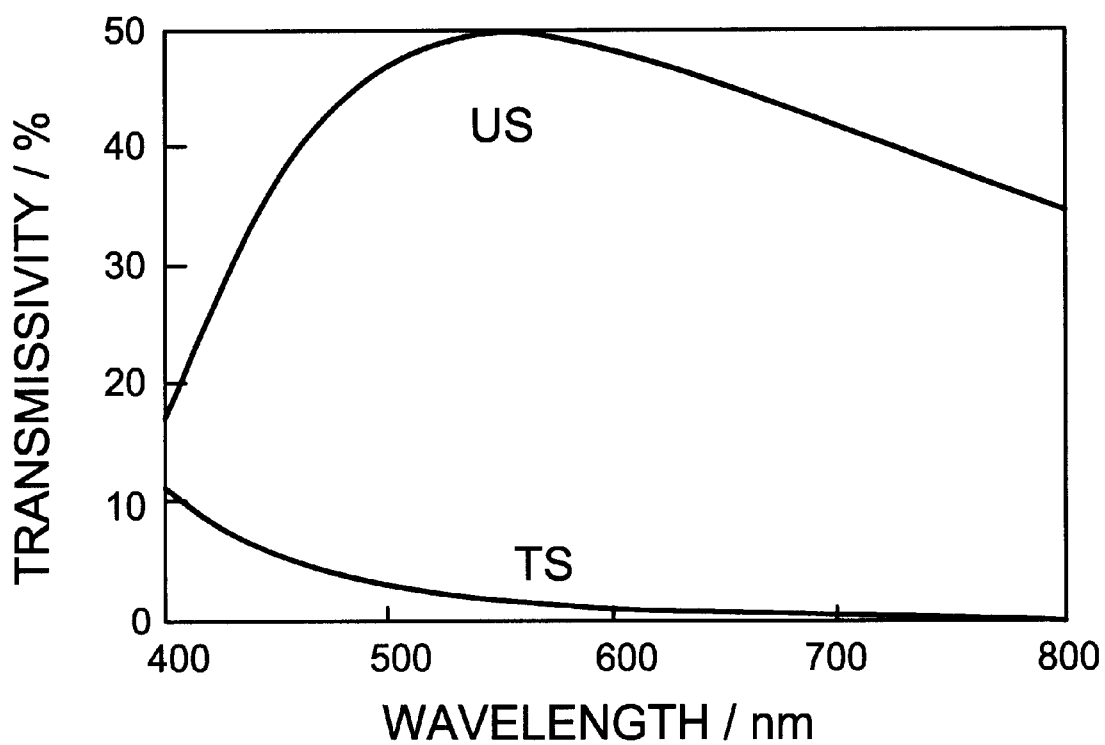
FIG. 4 shows transmittance spectra of a conventional liquid crystal display of FIG. 1, without the provision of a birefringent medium layer.

FIG. 4 shows transmittance spectra of a conventional liquid crystal display of FIG. 1, without the provision of a birefringent medium layer, wherein TS and US represent, respectively, the spectra for a twisted state and for a uniform (or non-twisted) state. In FIG. 4, a maximum transmissivity value of the TS spectrum is normalized to 50% and the values in succeeding figures are tabulated accordingly.

Although there is observed a certain wavelength dependence in transmissivity, a nearly white display quality is obtained for the US spectrum. Similarly, a nearly black color is obtained for the TS spectra. However, the transmissivity is generally high throughout the spectrum region and there exists some light leakage especially in the short wavelength region, due to birefringent nature in the TS state.

In the present invention, by the provision of a birefringent medium layer, the birefringent effect of the display device can be reduced and liquid display devices having a high display contrast can be provided.

A first embodiment of the invention will now be described. In order to compensate a birefringent effect of the liquid crystal display in the twisted state of the present embodiment, a birefringent medium layer is further provided, having a twist angle which has approximately the same magnitude as, and an opposite direction to, that of a liquid crystal layer of the present embodiment.

An arrangement of a plurality of axes for the case mentioned just above is schematically represented in FIG. 5. In the figure, rL and rU represent the alignment directions of a lower and upper substrates, respectively, and pL and pU represent transmittance axes of a lower and upper polarizer, respectively. In a cell, liquid crystal molecules are arranged between the substrates so as to have a uniform (or non-twisted) state or 360° twisted state which is represented by $\omega_{Lc}$ in the figure.

A birefringent medium layer is provided between the liquid crystal cell and the upper substrate. The direction rL in the figure is the alignment direction of a lower face of, or a face opposing to the liquid crystal cell of, the twisted birefringent medium layer. Similarly, the direction rU in the figure is the alignment direction of an upper face of, or a face opposing to the polarizer of, the twisted birefringent medium layer. The birefringent medium layer can be arranged between the above two alignment directions so as to have an twist angle ωR. The angle θpL is between an alignment direction rL of the lower face of the liquid crystal and a transparency axis of the lower polarizer, θ pU is an angle between an alignment direction rU of the upper face of the birefringent medium layer and a direction of a transparency axis pU of the upper polarizer, and θr is an angle between an alignment direction of the upper face of the liquid crystal cell and a alignment direction rL of the lower face of the birefringent medium layer.

The magnitude of an angle ωR and Δnd value of a birefringent medium layer preferred for the present embodiment have a relationship with a Δnd value of the liquid crystal layer, represented as follows, $$\Delta nd(LC)=20\times\Delta nd(\text{Birefringent medium layer})/|\omega R|^{0.5}.$$

A twist angle of the birefringent medium layer may range from between about ωLC−270° and about ωLC+1800° and a compensation is feasible as long as the above-mentioned relationship is satisfied. Since a decrease of the twist angle results in a decrease of the contrast, and a twist angle that is to large, by contrast, makes uniform alignment difficult, the twist angle is more preferably from between about ωLC−180° and about ωLC+360°. For the above range of the twist angle, a Δnd value of the birefringent medium layer is obtained by the above-mentioned equation. The difference between calculated and practically usable Δnd values is preferably within 40%, and more preferably within 20%.

Moreover, it is especially preferred to have the magnitude of the angle δR is approximately same to the twist angle in the twisted state, and also to have approximately same values of Δnd between the liquid crystal and the birefringent medium layer. By "approximately equal" above-mentioned, it is meant that the difference in the angles is within 90°. The difference in Δnd values is preferably within 40%, and more preferably within 20%.

In addition, the angle θr is preferably from 70° to 110°, more preferably from 80° to 100°. Beyond the above-mentioned range, a satisfactorily compensation can not achieved, resulting in a reduced contrast. The angles θpL and θpU are preferably from 30° to 60°, and more preferably from 35° to 55°. Beyond this range, a reduction of the contrast also results.

With the present construction of the display, the compensation of the birefringent effect in the twisted state can be achieved almost completely. As seen from TS spectra in FIG. 6, an complete black display state can be obtained. In addition, the spectra US at the uniform state remains almost unchanged from the spectra before the compensation and has a relatively broad range of the transmittance, resulting in a fewer wavelength dependence of the transmissivity and therefore approaching to an improved white display quality. As a result, liquid crystal displays having excellent display qualities can be realized.

Figure 6:
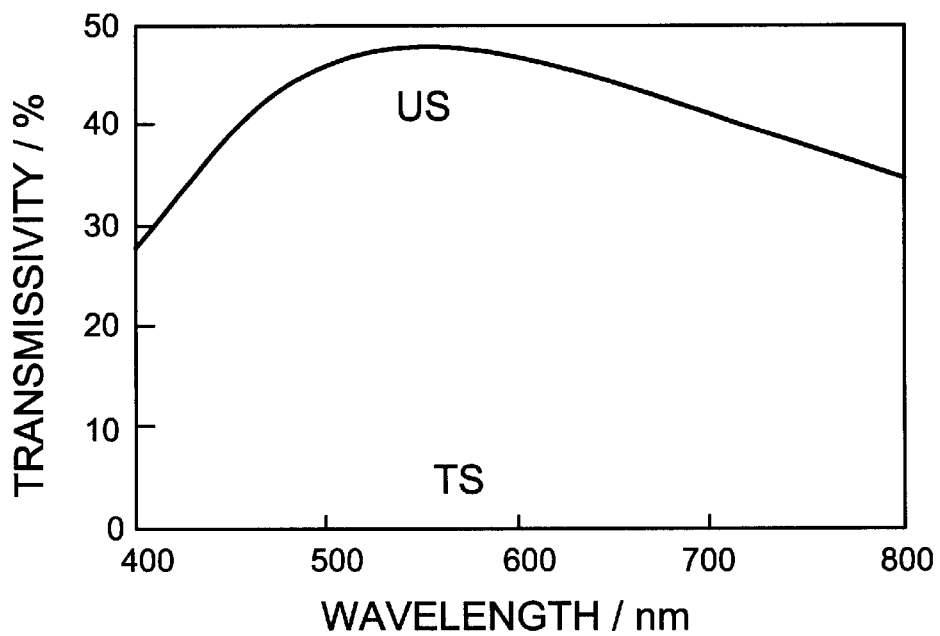
FIG. 6 shows transmittance spectra of a liquid crystal display of FIG. 5.

Results shown in FIG. 6 is obtained for the displays with Δnd=0.27. If the value becomes greater, a coloration in the uniform state results. By contrast, if the Δnd value becomes smaller, the display becomes bluish colored, and a reduction in transmissivity appears for much smaller values. A satisfactory black and white display quality is achieved for the liquid crystal Δnd value of preferably from 0.15 to 0.4 μm, and more preferably from 0.2 to 0.35 μm.

In addition, in the present construction of the displays, the wavelength dependencies of Δn of both of the liquid crystal cell and the birefringent medium layer also may affect the display contrast. If the above Δn values are different each other, a complete compensation can be achieved in some range of the wavelength but a certain degree of light leak results in other range. Accordingly, the wavelength dependence of Δn for both of the liquid crystal cell and the birefringent medium layer have to be equal or approximately equal to each other to achieve a high display contrast. For example, if the magnitude of the Δn dispersion is defined as $$v=(\Delta n_F-\Delta n_c)/\Delta n_D$$

the difference in ν for the both of the liquid crystal cell and birefringent medium layer is preferably within 50%, and more preferably within 30%, wherein $\Delta n_D$, $\Delta n_F$, and $\Delta n_c$ are Δn values at 589 nm, 486 nm, and 658 nm, respectively.

In the present invention, examples of birefringent medium layer having twisted structures include a liquid crystal cell having a twisted structure, a polymer liquid crystal with a twisted alignment, and an alignment-immobilized liquid crystalline polymer which is obtained by freezing molecules of the polymer liquid crystal aligned homogeneously. The liquid crystalline polymer is especially preferred, since it has a self-sustaining nature and its thickness can be considerably reduced.

The birefringent medium layer may be constructed with a single layer, which has a continuous twisted structure throughout the entire layer. In addition, the birefringent medium layer may also be constructed with a plurality of optically uniaxial birefringent layers overlaid with its axis shifted consecutively by a predetermined angle and adjusted to have optical characteristics which are substantially equal to that of single twisted layer structure.

In the present case, although a contrast is obtained somewhat reduced compared with that of the afore-mentioned continuous structure, the fabrication cost can be reduced, since relatively less expensive materials such as, for example, stretched polymer films can be used. Although the birefringent medium layer may be constructed with a single layer, as above-mentioned, having an entire layer has a uniform birefringent properties, some of the medium layer may also provided separately onto a transparent substrate or between the substrates.

Although the birefringent medium layer is exemplified as being provided on an upper face of a liquid crystal cell, the medium layer may also be provided on a lower face or both sides of the liquid crystal cell. The arrangement of the optical axes for the latter case is the same as that shown in FIG. 5, when viewed from the rear side of the liquid crystal cell. Also in the above example, although θpL and θpU are assumed to represent transparent axes of the polarizer, a similar description can be made if absorption axes are assumed in place of the transparent axes.

The optical properties of a birefringent medium can be represented by principal refractive index, nx, ny and nz. When nx is a refractive index for a slow axis, the following relationship is satisfied in a uniaxial optically anisotropic medium:

$$nx>ny=nz.$$

In a biaxial optically anisotropic medium, the following relationship is satisfied:

$$nx>ny>nz$$

or $$nx>nz>ny.$$

A nearly uniaxial ansotropic medium is a biaxial anisotropic medium which is optically similar to a uniaxial anisotropic medium and substantially acts as a uniaxial anisotropic medium when it is applied to a liquid crystal device. In a nearly uniaxial anisotropic medium, the following relationship is satisfied:

$$nx>ny \approx nz,$$

where ≈ indicates "nearly equal".

A second embodiment of the invention will be described, wherein a birefringent medium layer is selected such that a birefringent medium layer is nearly uniaxial with its slow axis in the plane of the layer and that its Δnd is approximately from 0.1 to 0.2 time of that of liquid crystal cell. In the present case, it is the birefringent effect at the twisted state which is to be compensated, similarly to embodiment 1.

FIG. 7 a schematic showing an arrangement of a plurality of axes of a liquid crystal display in accordance with the present embodiment.

A nearly uniaxial birefringent medium layer is provided between a liquid crystal cell and an upper polarizer. In the figure, rL and rU represent slow axes of the birefringent medium layer, θpU is an angle between an alignment direction of the upper face of the birefringent medium layer and a transparency axis of the upper polarizer, θr is an angle between an alignment direction of the upper face of the liquid crystal cell and a slow axis of the birefringent medium layer, and θpU represents an angle between a slow axis of the birefringent medium layer and a transparency axis of the upper polarizer. Other notations are the same as those in FIG. 5.

The angle θr is preferably from 60° to 120°, and more preferably from 70° to 110°; angle θpL is preferably from 30° to 60°, and more preferably from 35° to 45°; and angle θpU is preferably from 25° to 50°, and more preferably from 30° to 45°. Beyond the above-mentioned ranges of θr, θpL, and/or θpU, a satisfactory compensation can not achieved and the contrast is reduced.

In the present embodiment, coloration in the U state depends on a Δnd value of the liquid crystal cell, as well as that of the birefringent medium layer. The preferable range of the Δnd of the liquid crystal cell to achieve a satisfactory black and white display quality is slightly larger than that of the embodiment 1 and is preferably from 0.17 to 0.47 μm, and more preferably from 0.02 to 0.42 μm. A preferable Δnd value of the birefringent medium layer is from 0.02 to 0.07 μm.

Figure 8:
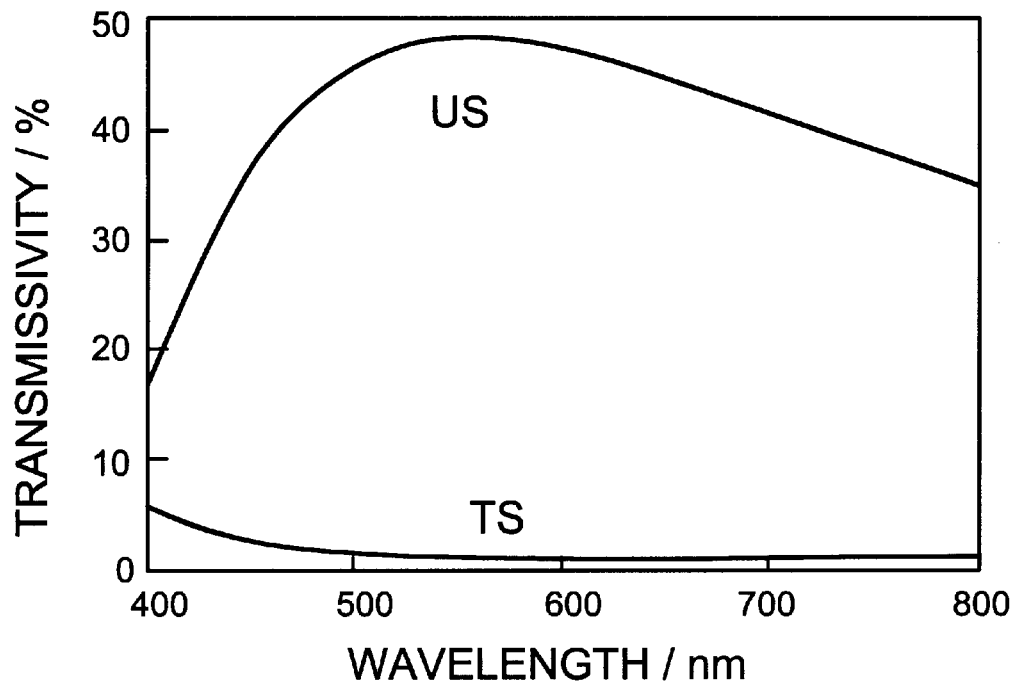
FIG. 8 shows transmittance spectra of a liquid crystal display of FIG. 7.

FIG. 8 shows transmittance spectra of a liquid crystal display in accordance with the present embodiment, indicating improved spectra of TS in black state and US in white state. When these spectra are compared to those of the previous embodiment, in which a twisted birefringent medium layer is used, a certain amount of light leak is noticeable in the black state. However, the present construction is still an considerable improvement over conventional methods for the compensation.

Also in the present construction of the displays, the wavelength dependencies of Δn for both of the liquid crystal cell and the birefringent medium layer affect display contrast.

When the wavelength dependence of Δn of the birefringent medium layer is comparable to or larger than that of the liquid crystal cell, the compensation in visible wavelength range is relative small and results in a light leak at the black state. In order to achieve a high contrast, therefore, it is necessary to adjust the wavelength dependence of Δn of the birefringent medium layer to be smaller than that of the liquid crystal cell.

Examples of nearly uniaxial birefringent medium layer suitable for the present invention include stretched or extruded films of polymers such as, for example, polycarbonate, polyvinylalcohol, cellulose triacetate, polyethylene, and polypropylene; a liquid crystal cell having a homogeneous alignment, an aligned polymer liquid crystal, or an alignment-immobilized liquid crystalline polymer which is obtained by freezing molecules of the polymer liquid crystal aligned homogeneously.

Figure 2B:

The birefringent medium layer may be used individually as mentioned above. In addition, as shown in FIG. 2B, a plurality of the above-mentioned birefringent layers 51a–51n can be used by overlaying with its slow axis shifted consecutively by a predetermined angle. The birefringent medium layer may be constructed with a single layer, having a uniform birefringent properties throughout the entire layer, and be provided separately onto a transparent substrate or between the substrates.

Figure 2C:
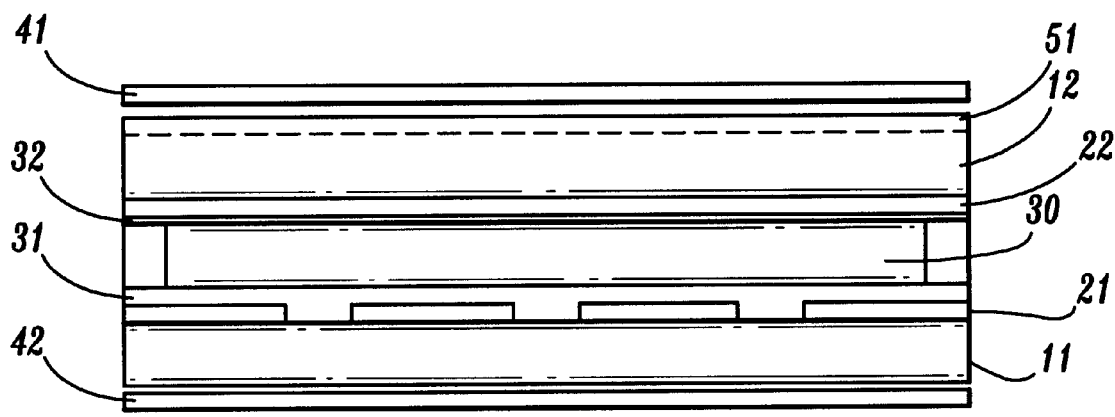

As shown in FIG. 2C, if the substrates of the liquid crystal display are of polymer films, the substrates (eg., substrate 12) themselves can be used as birefringent medium layer 51 by adjusting its Δnd value. By this construction, the parts number for the display device can be reduced and a thickness of the device can also be reduced. In addition, a birefringent medium layer can be provided at the bottom of the display in the present embodiment.

A third embodiment of the invention will be described, wherein a birefringent medium layer is selected to be nearly uniaxial with its slow axis in the layer plane and its Δnd value approximately equal to that of liquid crystal cell. By contrast with the previous two embodiments, a compensation in the uniform state is intended in the present embodiment.

Although the arrangement of the optical axes is similar to that shown in FIG. 7, the present construction is different from that of embodiment 2 at the point a birefringent medium layer is selected such that its Δnd is approximately same as that of liquid crystal cell in the present embodiment.

The angle θr is preferably from 70° to 110°, and more preferably from 80° to 100°, and the angles θpL and θpU are preferably from 30° to 60°, and more preferably from 35° to 55°. Beyond these ranges, a satisfactory compensation can not achieved and a display contrast is reduced.

As aforementioned, a birefringent medium layer is selected such that its Δnd is approximately same as that of liquid crystal cell. In order to achieve a satisfactory black and white display quality the difference in Δnd for the both of the liquid crystal cell and birefringent medium layer is preferably within 20%, and more preferably within 10%. In addition, Δnd of the liquid crystal cell is preferably from 0.15 to 0.4 μm, and more preferably from 0.2 to 0.35 μm.

Figure 9:
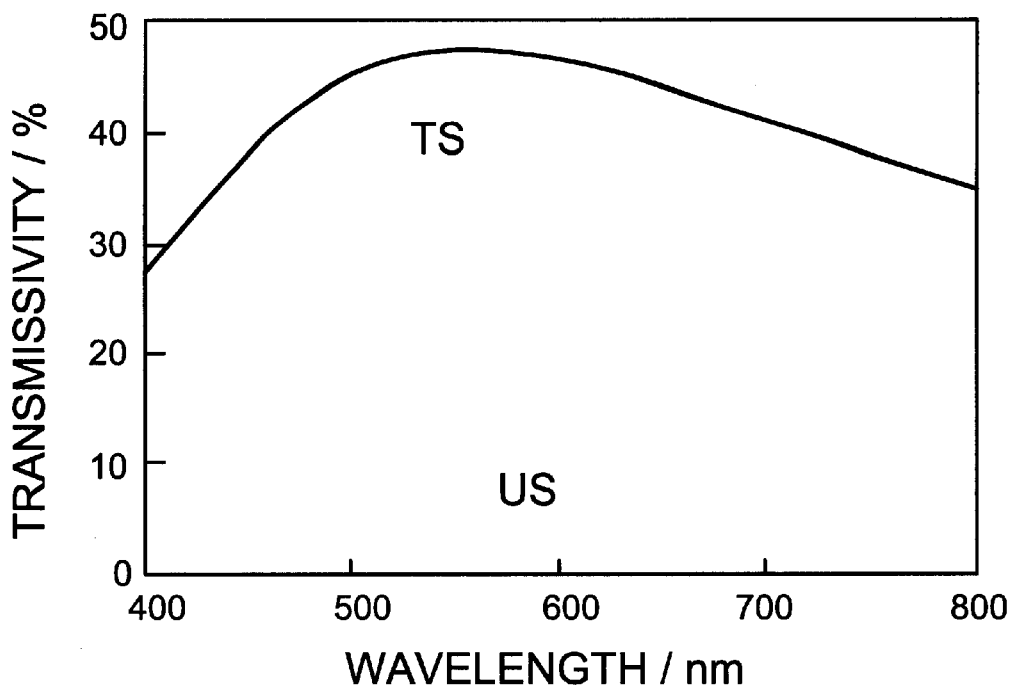
FIG. 9 shows other transmittance spectra of a liquid crystal display in accordance with a first embodiment of the invention wherein a liquid crystal cell was used as a birefringent medium layer, which had a parallel preferred orientation.

FIG. 9 shows transmittance spectra of a liquid crystal display in accordance with the present embodiment. The spectra US and TS corresponds to a uniform state or black state, and a twisted state or white state, respectively. Moreover, as seen from the spectra, the black display quality of this uniform state is quite complete without any of light leak and quite high in contrast. In addition, the spectra at the twisted state is broader in the transmittance region with a reduced wavelength dependence in the transmissivity, resulting in a white display quality considerably improved.

The present construction has advantages such as a fewer fabrication cost and others, since less expensive materials such as, for example, stretched films can be used as the birefringent medium layer.

In order to achieve a high contrast, a birefringent medium layer may be selected to have nearly the same wavelength dependence of Δn as that of the liquid crystal cell. For example, if the magnitude of the Δn dispersion is defined as $$v = (\Delta n_F - \Delta n_c)/\Delta n_D$$

the difference in ν for the both of the liquid crystal cell and birefringent medium layer is preferably within 50%, and more preferably within 30%, wherein Δnd, Δnf, and Δnc are Δn values at 589 nm, 486 nm, and 658 nm, respectively.

Examples of nearly uniaxial birefringent medium layers suitable for the present invention include stretched or extruded polymer films, a liquid crystal cell having a homogeneous alignment, an aligned polymer liquid crystal, or an alignment-immobilized liquid crystalline polymer which is obtained by freezing molecules of the polymer liquid crystal aligned homogeneously.

The liquid crystalline polymer is especially preferred, since the thickness of the birefringent medium layer can be considerably reduced and the dispersion of refractive indices can be designed in variety of ways by the use of liquid crystals.

The birefringent medium layer may be used individually as mentioned above, and a plurality of the present birefringent medium layer can also be used constructed by overlaying a plurality of the layers with its slow axis shifted consecutively by a predetermined angle. The birefringent medium layer may be constructed with a single layer which has a uniform birefringent properties throughout the entire layer has a single, and some part of the medium layer may also provided separately onto a transparent substrate or between the substrates.

If substrates of the liquid crystal display are of polymer films, the substrates themselves can be used as birefringent medium layer, by adjusting its Δnd value.

As liquid crystals suitable for the present invention, liquid crystal comprising a nematic liquid crystal having a positive dielectric anisotropy, mixed with cholesteric liquid crystal is preferably used. As the nematic liquid crystal, a dual-frequency addressable liquid crystal, of which dielectric anisotropy change its sign with frequency, may also be used. An intrinsic pitch the liquid crystal is preferably about twice of a thickness of the liquid crystal cell.

The alignment of liquid crystal molecules is preferably tilt-aligned, wherein the aligned molecules are tilted by an angle of from 1.5° to 30° to the substrate. This alignment can be achieved by using conventional substrates such as, for example, polymer films of polyimide, polyamide, or polyvinyl alcohol, of which surface is formed by well known method such as, for example, by rubbing with a cotton cloth, or by oblique vacuum evaporation of metal oxides.

The above description was carried out for the transparent type of liquid crystal displays and a backlight unit may be provided in the rear side of the display. In addition, liquid crystal displays are used also as the transparent type by providing a reflecting plate in place of the backlight unit. In addition, by further providing color filters, liquid crystal displays may implement color displays.

The following examples are provided further to illustrate preferred embodiments of the invention.

EXAMPLES

Example 1

A sheet of plate glass having transparent electrodes was coated with polyimide (AL3046 from Japan Synthetic Rubber Co) and subsequently alignment treated by rubbing, thereby forming a first substrate.

A second substrate was prepared in a similar manner as above. The first and second substrates were subsequently arranged apart from, and opposed to each other with silica beads disposed in-between as spacers.

A liquid crystal was then sealed between the substrates to constitute a liquid crystal display cell. In this embodiment, a liquid crystal prepared by adding 1.1% by weight of a chiral nematic liquid crystal (S811 from Merck & Co), which induces a left-handed helical structure, in a nematic liquid crystal (Δn=0.79; ZLI3412-000 from Merck & Co) so as to have a helical pitch of 8.2 μm.

A thickness of the liquid crystal layer was adjusted to 4.1 μm by selecting a diameter of the spacer beads. In addition, the alignment directions by rubbing treatment, of the top and bottom substrates were arranged in an anti-parallel fashion.

On top of the display cell, a polycabonate film having a Δnd value of 40 nm was provided such that a slow axis of the film was arranged to have a right angle relative to the direction of the rubbing alignment of the top substrate. Subsequently, by disposing a pair of polarizers on the top and bottom faces of the cell substrate, a liquid crystal display of the present invention was fabricated. At this point, the direction of transparency axis for the top and bottom polarizing plates were arranged to be 45° and 35°, for θpL and θpU, respectively.

Transmittance spectra of the display device were measured for each of the states TS and US. FIG. 8 represents the spectra observed, indicating a considerable improvement on the light leakage in short wavelength region, achieved by the provision of the birefringent medium layer of the present invention over the spectra shown in FIG. 4, which were previously obtained for the display device without birefringent medium layers.

Example 2

A first liquid crystal display device was fabricated in a similar manner to Example 1, with the exception that the display had a thickness of a layer of liquid crystal of 3.5 μm and a helical pitch of 1.8 μm.

In addition, a second display device was fabricated by using display cell fabricated in a similar manner to Example 1, with the exception that a liquid crystal was prepared by adding a chiral nematic liquid crystal (R811 from Merck Co), which induces a right-handed helical structure, to the ZLI3412-000 nematic liquid crystal so as to have a helical pitch of 3.5 μm and twisted by 360° in the opposite direction.

Subsequently, the second display device was overlaid onto the first display device such that a direction of the rubbing alignment of an upper substrate of the first display device had a right angle to that of a lower substrate of the second display device, followed by the provision of a pair of polarizing plates on the upper and lower face of the cell substrates, whereby constituting a liquid crystal display of the present invention. At this point, the direction of transparency axis for both of the upper and lower polarizer θpL and θpU was arranged to be 45°.

Transmittance spectra of the display device were measured for both of the states TS and US. FIG. 6 represent the spectra, indicating a nearly complete contrast achieved in the black TS state. Moreover, the spectra in the TS state have a broader range in transmittance curve which is indicative of an improved white display quality.

Example 3

A liquid crystal display was fabricated in a similar manner to Example 1, with the exception that, in place of the carbonate film of Example 1, a liquid crystal cell was used which had a parallel preferred orientation, a Δn value of 0.27 μm, and 45° angle for both θ pL and θ pU.

Light transmittance spectra of the display device were measured at each of states TS and US. FIG. 9 represents the measured spectra, indicating a complete compensation in the black state was achieved in the US state, resulting in a quite high contrast of the display.

Example 4

A liquid crystal display was fabricated in a similar manner to Example 3, with the exception that, in place of the cell of Example 3, a polycarbonate film having a Δn value of 0.27 μm, was used. At this point, it was found that the wavelength dependence of the Δn value was about one third of that of the above liquid crystal cell.

Although the obtained contrast was practically satisfactory, a slight leak of light was observed in the black state, indicating display characteristics not so satisfactory as of Example 3.

Example 5

A liquid crystal display was fabricated in a similar manner to Example 1, with the exception that, in place of the carbonate film of Example 1, a liquid crystal cell was used which had a parallel preferred orientation and a Δn value of 0.27 μm.

Although a practically satisfying contrast was obtained, a slight leak of light was observed in the black state, indicating the contrast previously obtained in Example 1 was superior to the present display.

Example 6

A liquid crystal display was fabricated in a similar manner to Example 1, with the exception that a carbonate film which had a thickness of 100 μm and a corresponding Δn value of 0.04 μm, was used as an upper substrate of a liquid crystal cell and no phase difference plate was provided.

The display was found to have as much excellent display characteristics as that of Example 1, even with such a thickness of the present substrate as one half of the glass plate (1.1 mm thick) in the Example 1.

Example 7

A phase shift plate was fabricated as follows. Solution of a thermotropic-cholesteric polymer liquid crystal, having a Δn value of 0.12 and a left-handed twist pitch of 2.3 μm, was coated to a thickness of 2.3 μm on a cellulose triacetate film which had a thickness of 100 μm and was alignment treated by rubbing.

The coated film was then dried and heated to such a temperature that a cholesteric phase of the polymer liquid crystal was formed and resulted in a preferred orientation in a direction twisted by 360°, followed by a quenching to room temperature at which the twisted structure was sufficiently fixed.

The twisted phase shifting plate prepared as above was used in place of the reverse-twisted compensation cell in Example 2, to fabricate a display cell of the present invention.

The display device was found to have as much excellent optical characteristics as that of Example 2, even with a half thickness of the compensation liquid crystal cell.

Example 8

A plurality of first and second (or compensation) liquid crystal cells were fabricated in a similar manner to Example 2, such that the cells had various cell thickness under the condition that Δnd values for the first and second cells were kept equal to each other.

When Δnd values were smaller than about 0.15 or greater than about 0.4, a significant coloration was observed. The results are shown in Table 1.

TABLE 1

| Δnd | color |
| --- | --- |
| 0.1 | blue |
| 0.15 | bright blue |
| 0.2 | bluish white |
| 0.25 | white |
| 0.3 | white |
| 0.35 | yellowish white |
| 0.4 | yellow |
| 0.45 | orange |

Example 9

A plurality of first and second (or compensation) liquid crystal cells were fabricated in a similar manner to Example 1, such that the cells had various thickness under the condition that the ratio of Δnd of the first cell to that of the second cell remained constant.

When the Δnd value for the first cell was smaller than about 0.17 or greater than about 0.42, a significant coloration was observed.

Example 10

A liquid crystal cell was fabricated in a similar manner to Example 2, with the exception that, in place of the second (or compensation) cell, a phase shifting plate was provided, which was constituted of four sheets of carbonate films, each having a Δnd value of 0.07 μm and overlaid in such a manner that the slow phase axis of each film was consecutively shifted by 120°.

Although a resultant cell exhibited a light leak in TS state larger than that of Example 2, the display device showed a contrast twice as good as conventional devices.

Example 11

A second liquid crystal cell was fabricated in a similar manner to Example 2, with the exception that the liquid crystal cell had a twist angle of 720° in the direction opposite to that of the first liquid crystal cell with a thickness of 5.3 μm.

Although the present display device has a transmittance value at 550 nm in the TS state, 0.1% higher than that of embodiment 2, the display device exhibited a satisfactory contrast.

Additional modifications and variations of the present invention are possible in light of the above teachings. It is therefore to be understood that within the scope of the appended claims, the invention may be practiced otherwise than as specifically described herein.

What is claimed is:

1. A liquid crystal display device comprising:
   a pair of spaced apart substrates;
   each of said substrates being alignment treated such that a direction of said alignment having a slight angle of inclination to said substrate and being substantially parallel to each other;
   a cholesteric liquid crystal layer disposed between said pair of substrate, having an intrinsic helical pitch of approximately twice as large as a spacing between said substrates, to constitute a liquid crystal cell;
   said cholesteric liquid crystal layer having a bistable character capable of switching bistable states by an application of voltage such that a twist angle of said liquid crystal layer along the direction of a thickness thereof being either approximately 360° or an angle subtracted 360° from the approximately 360°;
   a pair of polarizers each provided on an upper face and lower face of said liquid crystal cell; and
   at least one birefringent medium layer further provided between said polarizer and said substrate at least for either one of an upper or lower set of said polarizer and said substrate, to reduce a birefringence effect thereof at one of said bistable states, wherein said birefringent medium layer is nearly uniaxial, having a slow axis in the plane of the birefringent medium layer and a Δnd value of said birefringent medium layer is approximately equal to that of said liquid crystal cell, and an approximately right angle between a slow axis of said birefringent medium layer and an alignment direction of the face of the liquid crystal opposing to the birefringent medium layer.

2. The liquid crystal display device in accordance with claim 1, wherein a Δnd value of said liquid crystal layer is from 0.15 to 0.4 μm.

3. The liquid crystal display device in accordance with claim 1, wherein the wavelength dependence of Δn for said liquid crystal layer and said birefringent medium layer are equal or approximately equal to each other.

4. The liquid crystal display device in accordance with claim 1, wherein said birefringent medium layer is selected from the group consisting of a stretched or extruded polymer film, a liquid crystal cell having a homogeneous alignment, an aligned polymer liquid crystal, and an alignment-immobilized liquid crystalline polymer which is obtained by freezing molecules of the polymer liquid crystal aligned homogeneously.

5. A liquid crystal display device having a pair of spaced apart substrates, each of said substrates being alignment treated such that a direction of said alignment having a slight angle of inclination to said substrate and being substantially parallel to each other, a cholesteric liquid crystal layer disposed between said pair of substrate, having an intrinsic helical pitch of approximately twice as large as a spacing between said substrates, to constitute a liquid crystal cell; said cholesteric liquid crystal layer having a bistable character capable of switching bistable states by an application of voltage such that a twist angle of said liquid crystal layer along a cell thickness being either approximately 360° or an angle subtracted 360° from the approximately 360°, and a pair of polarizers each provided on an upper and lower faces of said liquid crystal cell, the improvement comprising:
   at least one birefringent medium layer further provided between said polarizer and said substrate for at least either one of an upper or lower set of said polarizer and said substrate, to reduce a birefringence effect thereof at one of said bistable states, wherein said birefringent medium layer has a slow axis in the plane of the birefringent medium layer and a Δnd value of said birefringent medium layer is approximately equal to that of liquid crystal cell, and an approximately right angle between a slow axis of said birefringent medium layer and an alignment direction of the face of the liquid crystal opposing to the birefringent medium layer.

6. The liquid crystal display device in accordance with claim 5, wherein a Δnd value of said liquid crystal layer is from 0.15 to 0.4 μm.

7. The liquid crystal display device in accordance with claim 5, wherein the wavelength dependence of Δn for said liquid crystal layer and said birefringent medium layer are equal or approximately equal to each other.

8. The liquid crystal display device in accordance with claim 5, wherein said birefringent medium layer is selected from the group consisting of a stretched or extruded polymer film, a liquid crystal cell having a homogeneous alignment, an aligned polymer liquid crystal, or an alignment-immobilized liquid crystalline polymer which is obtained by freezing molecules of the polymer liquid crystal aligned homogeneously.

9. A liquid crystal display device having a pair of spaced apart substrates, each of said substrates being alignment treated such that a direction of said alignment having a slight angle of inclination to said substrate and being substantially parallel to each other, a cholesteric liquid crystal layer disposed between said pair of substrate, having an intrinsic helical pitch of approximately twice as large as a spacing between said substrates, to constitute a liquid crystal cell; said cholesteric liquid crystal layer having a bistable character capable of switching bistable states by an application of voltage such that a twist angle of said liquid crystal layer along a cell thickness being either approximately 360° or an angle subtracted 360° from the approximately 360°, and a pair of polarizers each provided on an upper and lower faces of said liquid crystal cell, the improvement comprising:
   at least one birefringent medium layer formed from a surface of said substrate facing said polarizer so as to provide the at least one birefringent medium layer between said polarizer and said substrate for at least either one of an upper or lower set of said polarizer and said substrate, to reduce a birefringence effect thereof at one of said bistable states, wherein said birefringent medium layer has a slow axis in the plane of the birefringent medium layer and a Δnd value of said birefringent medium layer is approximately equal to that of liquid crystal cell, and an approximately right angle between a slow axis of said birefringent medium layer and an alignment direction of the face of the liquid crystal opposing to the birefringent medium layer.

10. A liquid crystal display device having a pair of spaced apart substrates, each of said substrates being alignment treated such that a direction of said alignment having a slight angle of inclination to said substrate and being substantially parallel to each other, a cholesteric liquid crystal layer disposed between said pair of substrate, having an intrinsic helical pitch of approximately twice as large as a spacing between said substrates, to constitute a liquid crystal cell; said cholesteric liquid crystal layer having a bistable character capable of switching bistable states by an application of voltage such that a twist angle of said liquid crystal layer along a cell thickness being either approximately 360° or an angle subtracted 360° from the approximately 360°, and a pair of polarizer each provided on an upper and lower faces of said liquid crystal cell, the improvement comprising:

a plurality of birefringent medium layers overlaid with their axis shifted consecutively by a predetermined angle further provided between said polarizer and said substrate for at least either one of an upper or lower set of said polarizer and said substrate, to reduce a birefringence effect thereof at one of said bistable states, wherein said birefringent medium layer has a slow axis in the plane of the birefringent medium layer and a $\Delta nd$ value of said birefringent medium layer is approximately equal to that of liquid crystal cell, and an approximately right angle between a slow axis of said birefringent medium layer and an alignment direction of the face of the liquid crystal opposing to the birefringent medium layer.

* * * * *